United States Patent
Chakrabarti et al.

(10) Patent No.: US 12,007,954 B1
(45) Date of Patent: Jun. 11, 2024

(54) SELECTIVE FORWARDING FOR MULTI-STATEMENT DATABASE TRANSACTIONS

(71) Applicant: Amazon Technologies, Inc., Seattle, WA (US)

(72) Inventors: Dhruva Ranjan Chakrabarti, San Jose, CA (US); Atrayee Mullick, Cupertino, CA (US); Damien Katz, Alameda, CA (US); Saraswathy Narayan, Fremont, CA (US); Jianguo Wang, Sunnyvale, CA (US); Huawei Wang, Menlo Park, CA (US); Alexandre Olegovich Verbitski, Woodinville, WA (US); Tengiz Kharatishvili, Issaquah, WA (US); Yingjie He, Cupertino, CA (US); Gopi Krishna Attaluri, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 16/870,824

(22) Filed: May 8, 2020

(51) Int. Cl.
  *G06F 16/18* (2019.01)
  *G06F 9/54* (2006.01)
  *G06F 16/11* (2019.01)
  *G06F 16/182* (2019.01)

(52) U.S. Cl.
  CPC .......... *G06F 16/1865* (2019.01); *G06F 9/542* (2013.01); *G06F 16/128* (2019.01); *G06F 16/184* (2019.01)

(58) Field of Classification Search
  CPC ............. G06F 16/1865; G06F 16/2365; G06F 16/184; G06F 16/273; G06F 16/168; G06F 16/128; G06F 9/542; G06F 9/3009
  USPC .......................................... 707/610, 615, 703
  See application file for complete search history.

(56) References Cited

U.S. PATENT DOCUMENTS

| | | | |
|---|---|---|---|
| 5,687,363 A * | 11/1997 | Oulid-Aissa | G06F 16/27 |
| 7,177,866 B2 * | 2/2007 | Holenstein | G06F 16/2343 |
| | | | 707/615 |
| 7,917,693 B2 | 3/2011 | Kazar et al. | |
| 8,874,609 B1 | 10/2014 | Singh et al. | |
| 9,507,843 B1 | 11/2016 | Madhavarapu et al. | |
| 9,984,140 B1 | 5/2018 | Sukumaran et al. | |
| 10,599,659 B2 * | 3/2020 | Glass | G06F 16/24578 |
| 2005/0234936 A1 | 10/2005 | Castro | |
| 2007/0118559 A1 | 5/2007 | Christiansen | |
| 2011/0178985 A1 | 7/2011 | San Martin Arribas et al. | |
| 2012/0054158 A1 | 3/2012 | Hu et al. | |

(Continued)

OTHER PUBLICATIONS

U.S. Appl. No. 16/870,772, filed May 8, 2020, Saraswathy Narayan, et al.

(Continued)

*Primary Examiner* — Shahid A Alam
(74) *Attorney, Agent, or Firm* — S. Scott Foster; Kowert, Hood, Munyon, Rankin & Goetzel, P.C.

(57) ABSTRACT

Transaction statements may be forwarded for a database transaction. A transaction begun at a read-only node may include a write statement. The read-only node may forward the write statement to the read-only node to perform as a transaction. The read-only node may update a read view for the transaction to include the write statement before performing a read statement submitted after the write statement at the read-only node.

20 Claims, 9 Drawing Sheets

(56) References Cited

U.S. PATENT DOCUMENTS

| | | | |
|---|---|---|---|
| 2014/0279840 A1* | 9/2014 | Chan | G06F 16/22 |
| | | | 707/607 |
| 2014/0380007 A1 | 12/2014 | Suen et al. | |
| 2015/0127491 A1* | 5/2015 | Duggar | G06F 16/951 |
| | | | 705/26.62 |
| 2016/0110408 A1* | 4/2016 | Madhavarapu | G06F 16/2358 |
| | | | 707/615 |
| 2016/0189225 A1* | 6/2016 | Glover | G06F 16/248 |
| | | | 705/14.55 |
| 2017/0017692 A1 | 1/2017 | Das et al. | |
| 2017/0091226 A1 | 3/2017 | Kharatishvili et al. | |
| 2017/0140006 A1* | 5/2017 | Yang | G06F 16/9535 |
| 2017/0206236 A1 | 7/2017 | Kharatishvili | |
| 2018/0181600 A1 | 6/2018 | Lee et al. | |
| 2018/0232412 A1 | 8/2018 | Bensberg et al. | |
| 2021/0117378 A1* | 4/2021 | Zhao | G06F 16/162 |

OTHER PUBLICATIONS

U.S. Appl. No. 16/870,825, filed May 8, 2020, Dhruva Ranjan Chakrabarti, et al.

"What is a Thread?" The Java Tutorial, https://www.liitk.ac.in/esc101/05Aug/tutorial/essential/thr4eads/definition.html, 2005, pp. 1-2.

"Difference between a proess and a thread", https://www.tutorialspoint.com/difference-between-process-and-thread, 2018 pp. 1-2.

* cited by examiner

SELECTIVE FORWARDING FOR MULTI-STATEMENT DATABASE TRANSACTIONS

BACKGROUND

Database systems support various kinds of systems, services, and applications. Efficient utilization of a database can include fully leveraging the capabilities of each database system component in order to provide fast and efficient database system operations. In turn, fast and efficient database system operations can improve the performance of the systems, services, or applications that rely upon the database.

Figure 1:
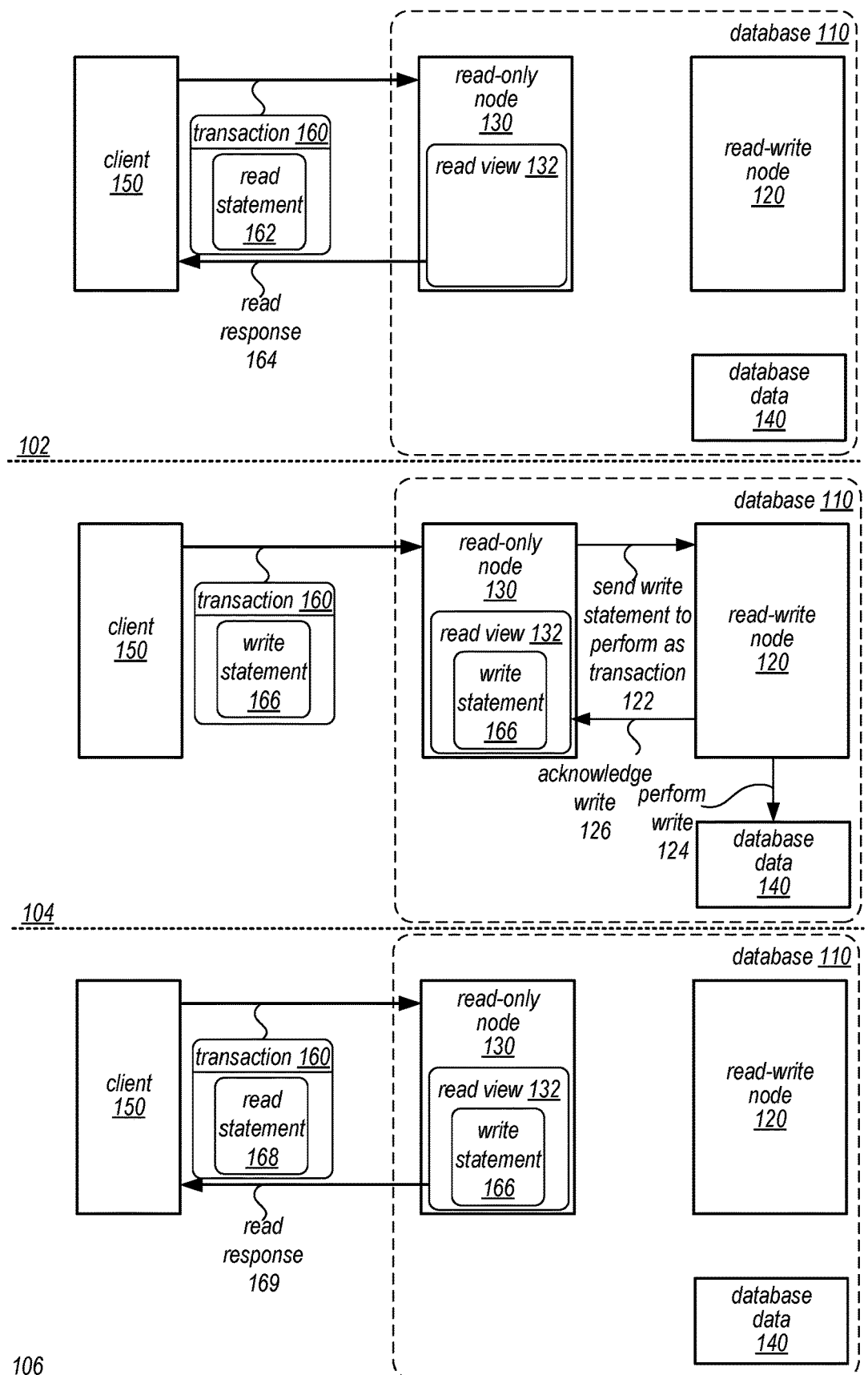
FIG. 1 is a logical block diagram illustrating selective forwarding for multi-statement database transactions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for selective forwarding for multi-statement database transactions are described herein. In various embodiments, database systems may divide the workload for performing different requests between different database system components. For example, a database system may implement multiple nodes to serve requests for the database, such as requests that perform reads to a database and writes to the database, and nodes that perform reads alone. In this way, a database system can maintain consistency for the database by implementing a single writer to the database, while allowing for other portions of the workload to be distributed to read-only nodes. However, in order to take advantage of this division, client services, systems, or applications of the database may have to divide up their workload to ensure that requests are sent to the component (e.g., the read-only node or read-write node) that can support the desired request (e.g., writes may be to the read-write node, but reads can go to either).

In various embodiments, selective forwarding for multi-statement database transactions may be implemented to remove the burden of dividing up workloads between different node types. For example, selective forwarding for multi-statement database transactions may allow read-only nodes to support both read and write requests through transactions, similar to a read-only node. Instead of sacrificing consistency, a read view for the transaction may be updated to ensure that read after write consistency within a transaction is maintained. In this way, selective forwarding for multi-statement database transactions can improve the performance of client systems, services, and applications because workloads do not have to be divided by type. Instead, workloads can be directed to database system nodes as needed (e.g., read-only nodes can be added to a database system to expand the read and write processing capacity for a client service, system, or application. Moreover, greater utilization of read-only nodes can be realized by a database system, leading to increased performance of a database system overall.

FIG. 1 is a logical block diagram illustrating selective forwarding for multi-statement database transactions, according to some embodiments. Database system 110 may be a database system implemented using multiple different nodes, such as read-only nodes 130 and read-write node 120, to access data stored in a database on behalf of client systems, services, or applications, such as database data 140. Database system 110 can be various types of database system that implement read-only and read-write nodes, including various types of relational, non-relational, or other types of database (e.g., graph, time-series, etc.) that offer different consistency levels that can be automatically managed for read requests when forwarding write requests.

Read-write node 120 may accept both read requests 126 (e.g., queries, gets, scans, or other requests that cause a read of database 140) and write requests 124 (e.g., insert, update, delete, put, store, modify, or other requests that cause a write to database data 140). The requests may be submitted via a read/write session that supports both types of requests and is established with a client service, system, or application of database system 110.

Database system 110 may also implement read-only nodes, such as read-only node 130. Read-only node 130 may be able to perform read requests by accessing a local copy, cache or replica of database data 140. In some embodiments, as discussed below with regard to FIGS. 2 and 3, database data 140 may be stored in shared storage that may be accessible for reads by read-only nodes 130 directly (if not for writes). To increase utilization of read-only nodes 130 and remove the burden of dividing client system, service, or applications between the different types of nodes, read-only nodes 130 may support transactions, such as transaction 160, to allow for both read statements and write statements of a transaction to be submitted to read-only node 130. For those statements that cannot be performed by the read-only node directly (e.g., write statements), read-only node 130 may forward the write statements. In some embodiments, however, read-only node 130 may forward statements (e.g., read statements) that read-only node can perform.

For example, as illustrated in scene 102, client 150 of database system 110 may submit a transaction 160 to read-only node 130. Transaction 160 may include a read statement (e.g., a stated read request to perform) 162. Read-only node 130 can perform the read statement 162 using a read view 132 defined for database data 140.

As illustrated in scene 104, client 150 may then submit a write statement 166 as part of transaction 160. Write statement 166 may sent, as indicated at 122 to read-write node 120 to be performed 124 with respect to database data 140. Read-write node 120 may acknowledge the write 126. Read-only node 130 may update its read view 132 to include the change made by the write statement 166, in some embodiments.

As illustrated in scene 106, client 150 may submit another read statement 168 as part of transaction 160. Read only node 130 can use read view 132 updated to include write statement 166 in order to provide read response 169. In this way, read response 169 will have correct read after write consistency within transaction 160.

Please note, FIG. 1 is provided as a logical illustration of database systems, storage, database data, read-only nodes, and read-write nodes, and is not intended to be limiting as to the physical arrangement, size, or number of components, modules, or devices to implement such features.

The specification first describes an example network-based database service that performs selective forwarding for multi-statement database transactions. Included in the description of the example network-based database service are various aspects of the example network-based database service, such as a primary node, read replica node, and a separate storage service. The specification then describes flowcharts of various embodiments of methods for implementing selective forwarding for multi-statement database transactions. Next, the specification describes an example system that may implement the disclosed techniques. Various examples are provided throughout the specification.

Figure 2:
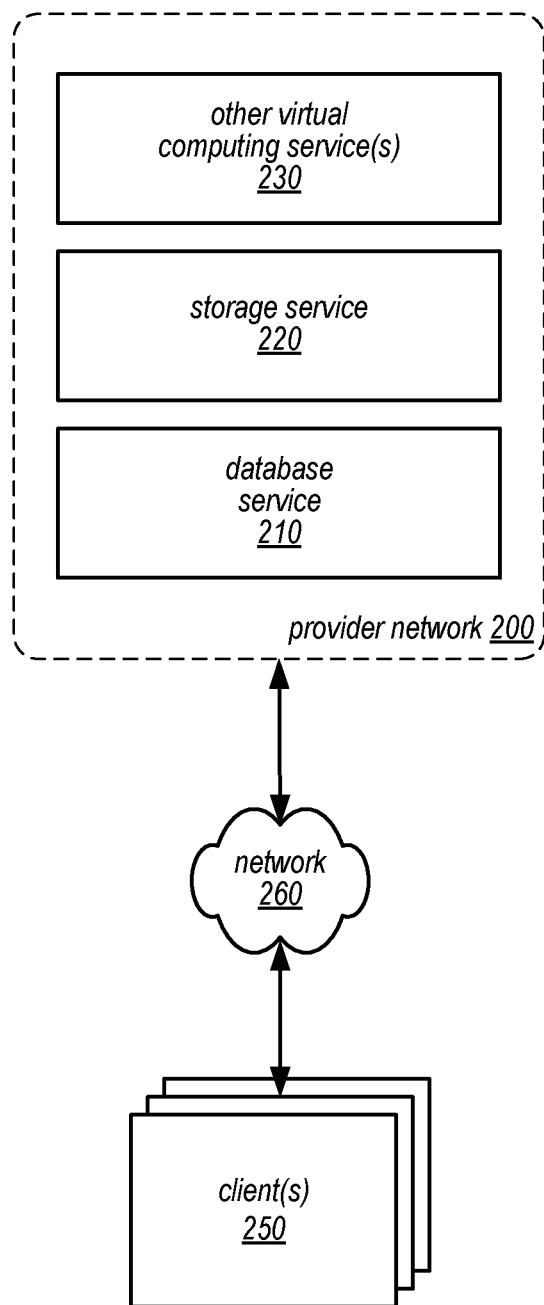
FIG. 2 is a block diagram illustrating a provider network that may implement a database service that implements selective forwarding for multi-statement database transactions, according to some embodiments.

FIG. 2 is a block diagram illustrating a provider network that may implement a database service that implements selective forwarding for multi-statement database transactions, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions.

In the illustrated embodiment, a number of clients (shown as clients 250 may interact with a provider network 200 via a network 260. Provider network 200 may implement respective instantiations of the same (or different) services, a database services 210, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to perform queries. For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
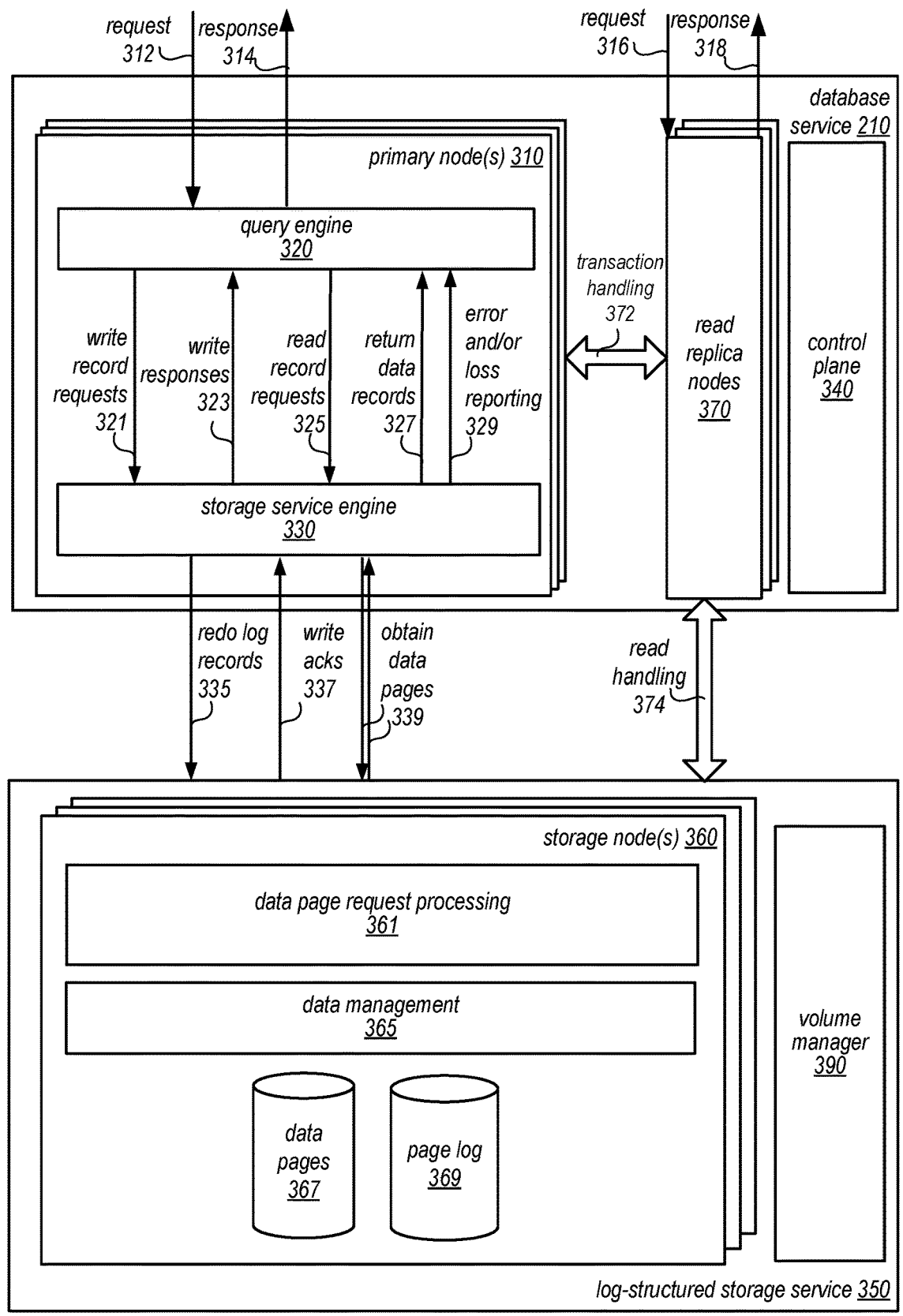
FIG. 3 is a block diagram illustrating various components of a database service and storage service that implement selective forwarding for multi-statement database transactions, according to some embodiments.

FIG. 3 is a block diagram illustrating various components of a database service and storage service that implement selective forwarding for multi-statement database transactions, according to some embodiments. Database service 210 may implement control plane 340 which may manage the creation, provisioning, deletion, or other features of managing a database hosted in database service 210.

Database service 210 may implement one or more different types of database systems with respective types of query engines for accessing database data as part of the database. In the example database system implemented as part of database service 210, a primary node 310 may be implemented for each of several databases and a log-structured storage service 350 (which may or may not be visible to the clients of the database system). Clients of a database may access a primary node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a primary node 310.

As previously noted, a database instance may include a primary node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, primary node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at primary node 310 (not illustrated) may manage a data page cache, in which data pages that were recently accessed may be temporarily held. Query engine 320 may be responsible for providing transactionality and consistency in the database instance of which primary node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to primary node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to primary node 310 (specifically to storage service engine 330). Storage service engine 330 may send the returned data pages to query engine 320 as return data records 327, and query engine may then evaluate the content of the data pages in order to determine or generate a result of a query sent as a response 314.

In some embodiments, various error and/or data loss messages 341 may be sent from log-structured storage service 350 to primary node 310 (specifically to storage service engine 330). These messages may be passed from storage service engine 330 to query engine 320 as error and/or loss reporting messages 329, and then to one or more clients as a response 314.

In some embodiments, the APIs 335-3339 of log-structured storage service 350 and the APIs 321-329 of storage service engine 330 may expose the functionality of the log-structured storage service 350 to primary node 310 as if primary node 310 were a client of log-structured storage service 350. For example, primary node 310 (through storage service engine 330) may write redo log records or request data pages through these APIs to perform (or facilitate the performance of) various operations of the database system implemented by the combination of primary node 310 and log-structured storage service 350 (e.g., storage, access, change logging, recovery, and/or space management operations).

Note that in various embodiments, the API calls and responses between primary node 310 and log-structured storage service 350 (e.g., APIs 321-329) and/or the API calls and responses between storage service engine 330 and query engine 320 (e.g., APIs 335-339) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with primary node 310 and/or log-structured storage service 350.

Database service 210 may also implement read replica nodes 370 for a database hosted by database service 210. Read replica nodes 370 may implement similar components to those of primary nodes 310, such as a query engine and storage service engine, which may be used to handle respective requests 316 and responses 318 received at a read replica. As discussed above with regard to FIG. 1 and below with regard to FIGS. 4-8, these read replicas, which may be a read-only node, may support both read and write requests to a database. Transaction handling 372 may be performed utilizing a primary node 310, as discussed in detail below. Read handling 374 may be performed by accessing local database caches or replicated data, which may be updated from updates received from primary node(s) 310 and/or by reading data from log-structured storage service, in some embodiments.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, as discussed in detail with regard to FIGS. 4 and 5, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In various embodiments, transaction forwarding for read-only nodes may be enabled or disabled for a database by a request (e.g., via an API, console, command line interface). In some embodiments, an active database may be changed to allow for transaction forwarding, while in other embodiments transaction forwarding may be enabled (or not selected, at the time of database creation. If transaction forwarding is not enabled, then a transaction request may be met with an error response or other indication that the transaction is not supported when received at a read replica, in some embodiments.

Figure 4:
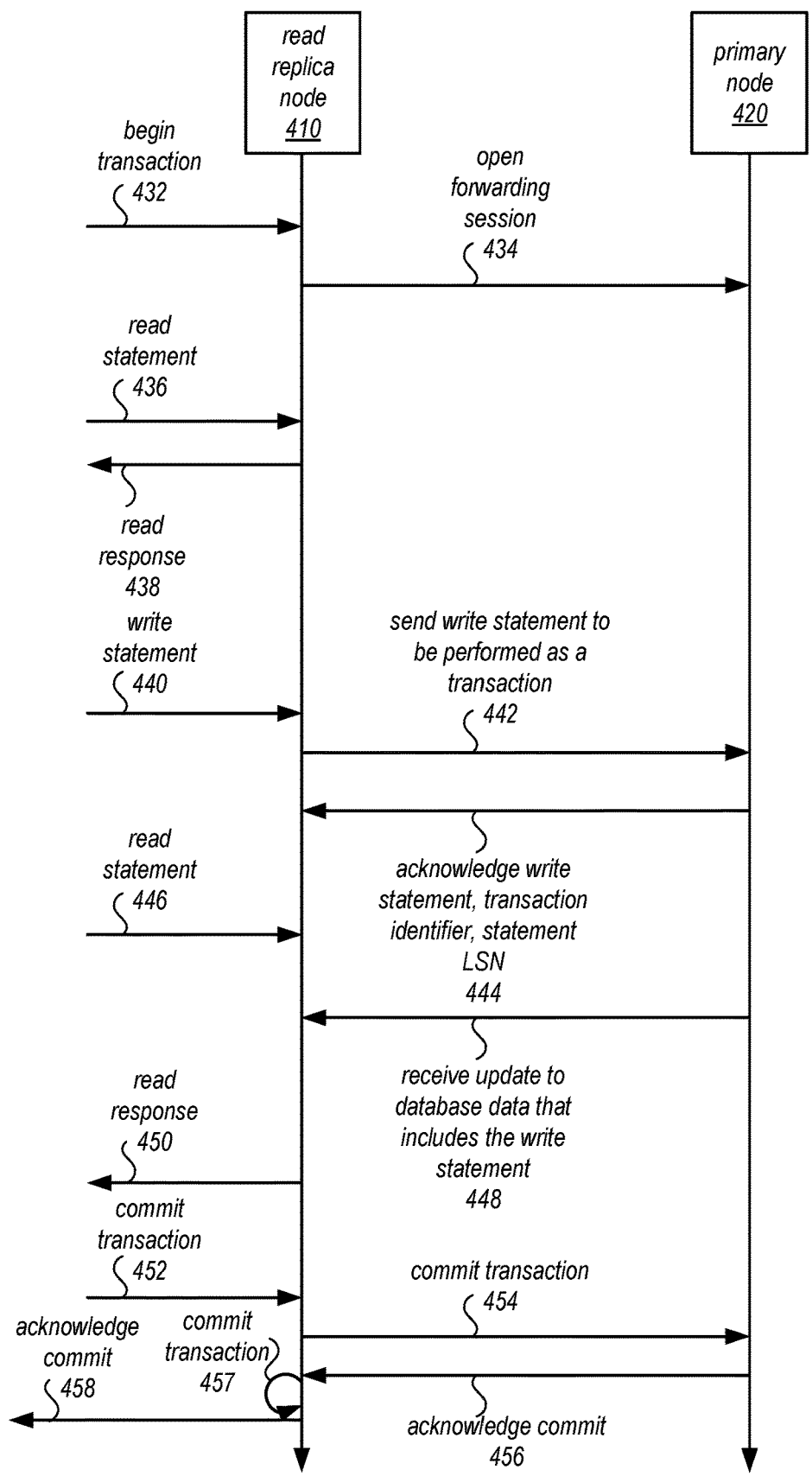
FIG. 4 is a block diagram illustrating interactions to perform a multi-statement transaction forwarding, according to some embodiments.

FIG. 4 is a block diagram illustrating interactions to perform a multi-statement transaction forwarding, according to some embodiments. For example, read replica node 410 may receive a request to begin a transaction, as indicated at 432. Read replica node 410 may open a transaction forwarding session 434 with primary node 420. Read replica node 410 may then receive a read statement 436 (e.g., a "select" statement). Read statement 436 may cause read replica node to create a read view for the database at read replica node 410 (in other scenarios a write statement (e.g., an "insert" statement) may be received first and thus may cause a read view to be generated). A response to the read, as indicated at 438, may be returned using the read view, in some embodiments.

As indicated at 440, a write statement may be received at read replica node 410. Write statement 440 may be sent by read replica node 410, as indicated at 442, to primary node 420, in some embodiments. The write statement may be sent as a transaction to primary node 420, which may perform the transaction. Primary node 420 may send a response to acknowledge the write statement, transaction identifier, and statement logical sequence number (LSN), in some embodiments.

As indicated at 446, another read statement may be received. In order to ensure that the read view includes the prior write (440), read replica node 410 may wait to return a read response until an update to database data at the read replica includes the write statement, as indicated at 448. The LSN values in the updates sent from primary node 420 to read replica 410 may indicate whether the prior write is included by comparing the LSN value of the prior write (received with the acknowledgement 444) with the LSN in the updates. As indicated at 450, a read response may be sent after the read view can be updated to include prior write 440.

As indicated at 452, a request to commit a transaction may be received. Read replica 410 may send a request to commit the transaction 454 to primary node 420. Primary node 420 may acknowledge the commit (or fail the transaction), as indicated at 456. Read replica node 410 may then commit the transaction, as indicated at 457 (e.g., update a transaction table or other information to indicate commitment) and acknowledge the transaction as committed, as indicated at 458.

Figure 5A:
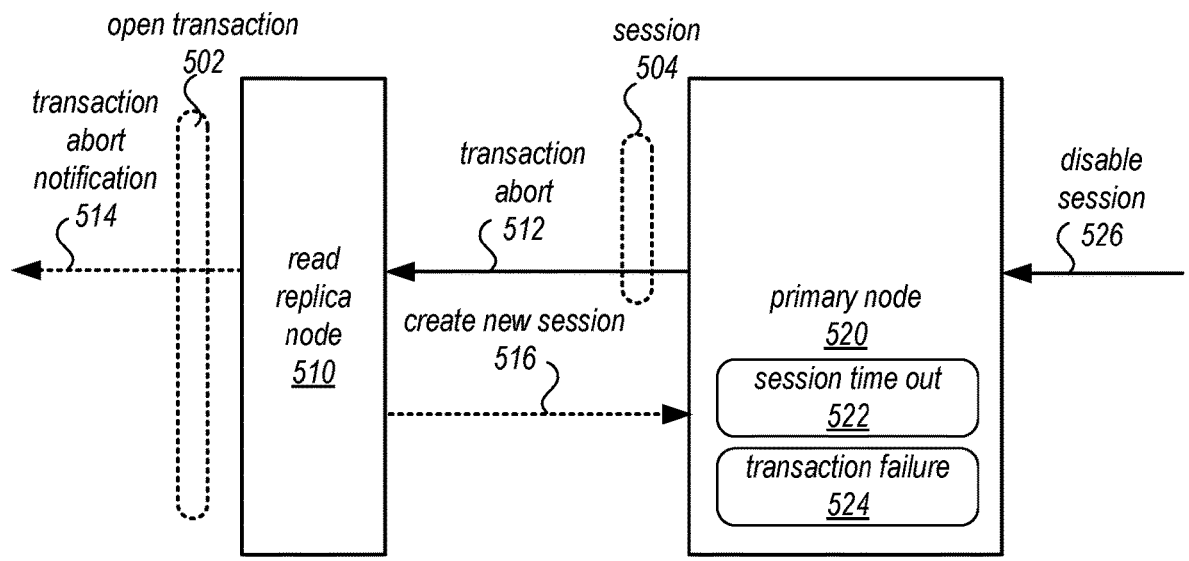
FIGS. 5A-5B are logical block diagrams illustrating roll-back events for transaction forwarding, according to some embodiments.

FIG. 5A are logical block diagrams illustrating rollback events for transaction forwarding, according to some embodiments. In FIG. 5A, rollback events may be detected at primary node 520. For example, a user may send a request to disable a session, as indicated at 526. In some embodiments, a session time out 522 may trigger a rollback event, such as when session 504 remains idle with no submitted statements more than X time. Rollback events may also be detected when transactions fail, as indicated at 524. For example, a transaction may fail because a conflict write obtained a lock on a data page before the write statement of the transaction.

Primary node 520 may notify read replica 510 of the aborted transaction, as indicated at 512, in some embodiments. Read replica 510 may decide whether to send via open transaction 502 an abort notification 514 or create a new session 516, in some embodiments. For example, a new session 516 may be created when the operations performed by primary node 520 can be performed by read replica node 510 and/or when no write statements were actually submitted, in some embodiments. Abort notifications 514 may be sent when the aborted transaction at the primary node cannot be recovered from by read replica node 510, in some embodiments.

Figure 5B:
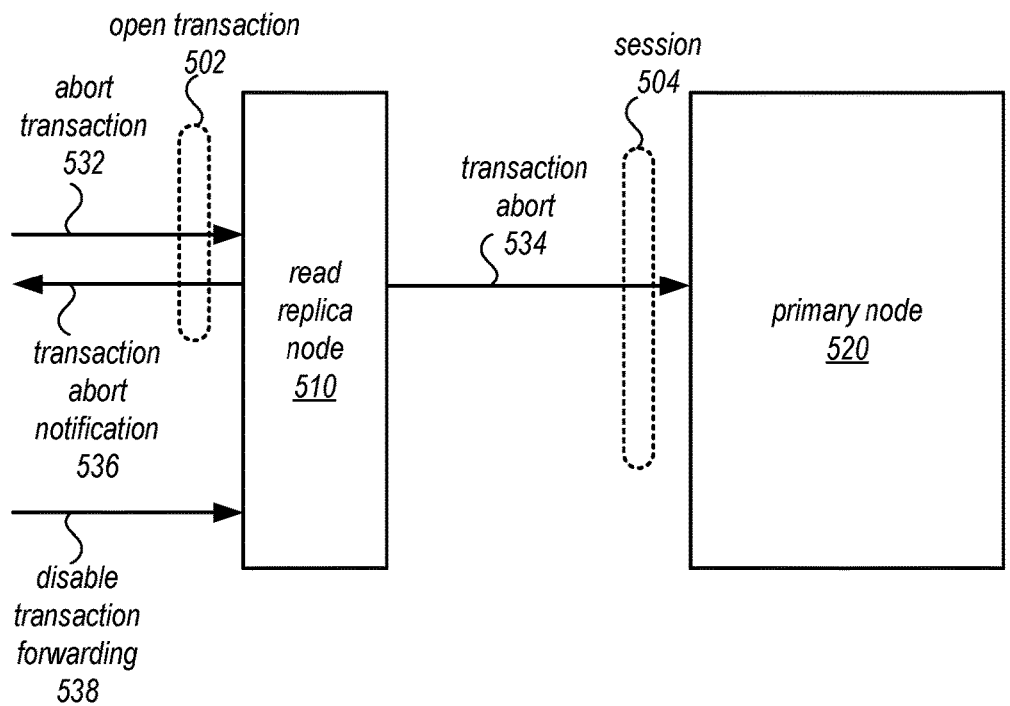

FIG. 5B illustrates rollback events detected at read replica nodes. Read replica node 510 may detect a roll back event when, for example, a request to abort the transaction, as indicated at 532 is received via transaction 502. In some embodiments, a request to disable transaction forwarding, as indicated at 538, may also cause an existing transaction to be aborted. Read replica node 510 may send a transaction abort notification 534 via session 504 to primary node 520 to perform, if necessary, appropriate roll-back actions (e.g., apply undo log records to undo the effects of previous writes).

Figure 6:
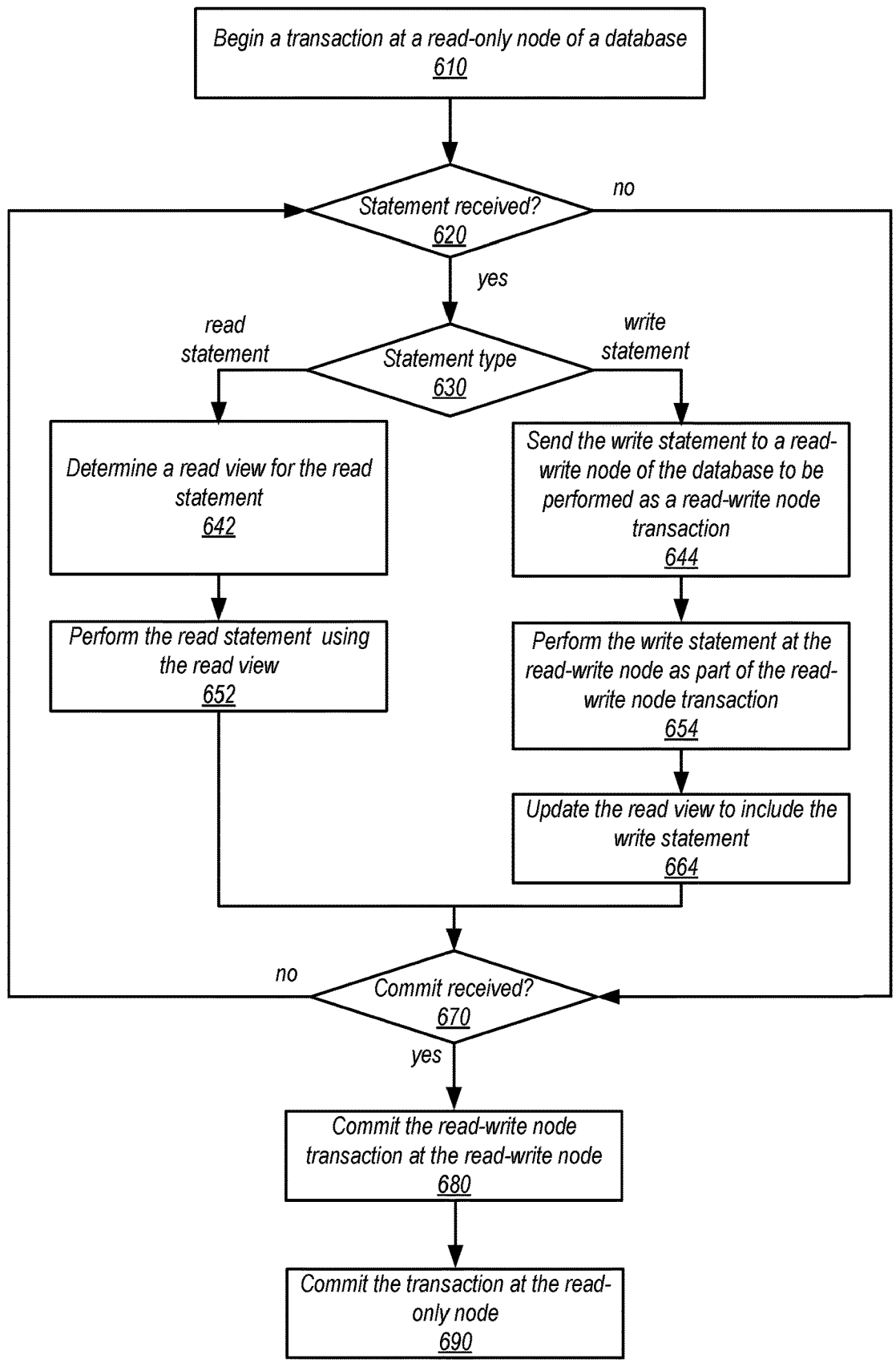
FIG. 6 is a high-level flowchart illustrating various methods and techniques to implement selective forwarding for multi-statement database transactions, according to some embodiments.

The database service and storage service discussed in FIGS. 2 through 5B provide examples of a database system that may implement selective forwarding for multi-statement database transactions. However, various other types of database systems may implement selective forwarding for multi-statement database transactions. FIG. 6 is a high-level flowchart illustrating various methods and techniques to implement selective forwarding for multi-statement database transactions, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 610, a transaction may begin at a read-only node of a database, in some embodiments. A transaction, in various embodiments, may be a group of one or more operations performed as part of the transaction that may succeed or fail together, in some embodiments. A transaction may be specified via an interactive interface (e.g., a graphical interface or command interface), which may allow a user to enter one or multiple statements, submit them for performance, receive results of the statements performance (e.g., query results or insert acknowledgement). Transactions may remain open, in some embodiments, until a request to commit the transaction is received so that the changes made by a transaction do not become visible to other clients of a database until the database system has committed them (which may be successful if the transaction does not conflict with another operation that takes precedence, such as an earlier submitted write or transaction). In some embodiments, a transaction may be submitted via a single request, to be started, operations performed, and committed without further actions from a user. Transaction statements may specify operations, such as read requests (e.g., requests to query, obtain, access, scan, view, or otherwise read data from a database), write requests (e.g., to insert, delete, modify, add, put, store, etc.), or other operations including start, begin, commit, abort, or end transactions. A transaction session or other transaction protocol may be initiated by a client application with the read-only node, in some embodiments. A key word, such as "Start" or "Begin" may be used in a statement, in some embodiments. As indicated at 620, a statement may be received as part of the transaction (if not then the technique may wait, commit, or abort (not illustrated), in some embodiments. As indicated at 630, a type for the statement of the transaction may be determined, in some embodiments.

For a read statement, a read view may be determined for the read statement, as indicated at 642, in some embodiments. For example, if no read view exists, then the read view may be created. If a read view already exists, then it may be identified. Existing read views may have been previously updated by write statements, as indicated at 664.

As indicated at 652, the read statement may be performed using the read view. For a write statement, the write statement may be sent to a read-write node of the database to be performed as a read-write node transaction, as indicated at 644. As indicated at 654, the write statement may be performed at the read-write node as part of the read-write node transaction, in some embodiments. As indicated at 664, the read view may be updated to include the write statement after the write statement is successfully performed by the read-write node (e.g., after receiving an acknowledgement).

The transaction may continue with new statements (e.g., read statements and/or new write statements until a commit is received, as indicated by the positive exit form 670. When a commit is received, then the read-write node may be requested to commit the transaction, as indicated at 680. For example, a "commit" command may be stated in a transaction. The transaction may also be committed at the read-only node, as indicated at 690.

Figure 7:
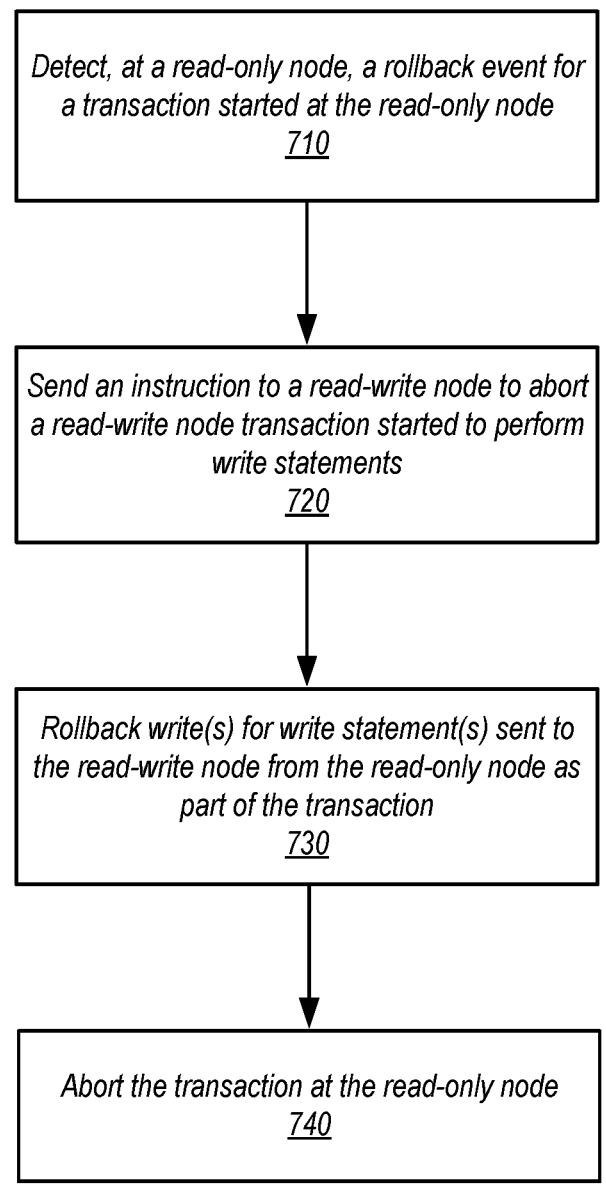
FIG. 7 is a high-level flowchart illustrating various methods and techniques to implement roll-back events for forwarded transactions at a read-only node, according to some embodiments.

FIG. 7 is a high-level flowchart illustrating various methods and techniques to implement roll-back events for forwarded transactions at a read-only node, according to some embodiments. As indicated at 710, a roll-back event may be detected for a transaction at a read-only node for a transaction started at the read-only node. A roll-back event may be triggered by a user requested transaction abort or a user requested modification to write forwarding for the read-only node (e.g., by disabling write forwarding), in some embodiments.

As indicated at 720, an instruction to a read-write node may be sent to abort a read-write node transaction started to perform write statements for the transaction, in some embodiments. As indicated at 730, write(s) for write statement(s) sent to the read-write node from the read-only node as part of the transaction may be rolled back, in some embodiments. As indicated at 740, the transaction may be aborted at the read-only node, in some embodiments.

Figure 8:
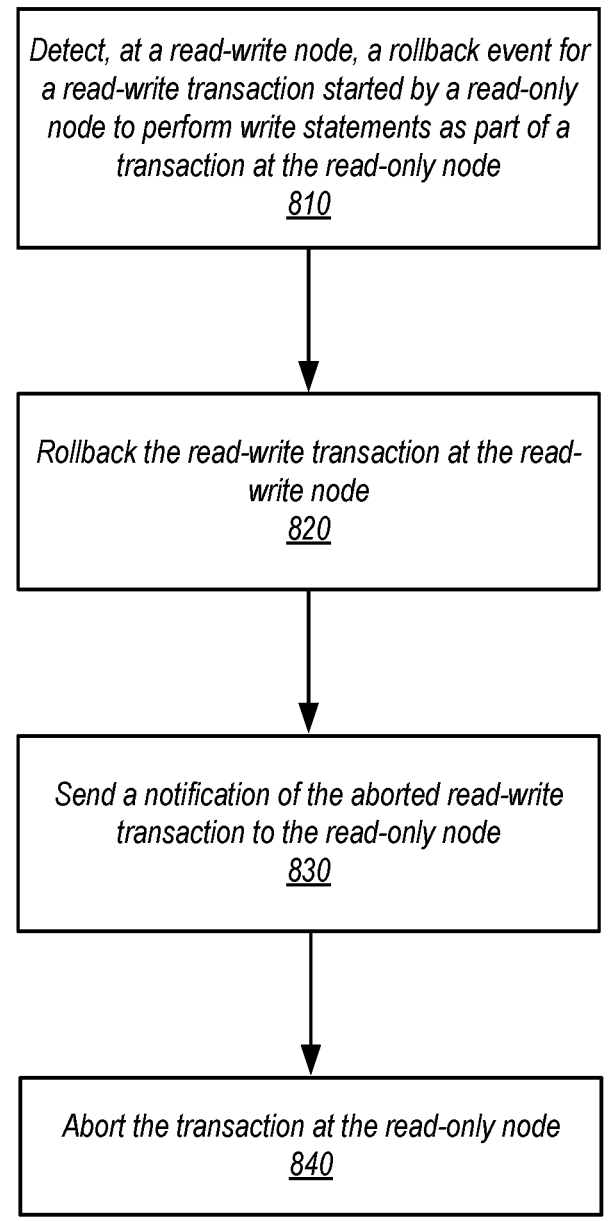
FIG. 8 is a high-level flowchart illustrating various methods and techniques to implement roll-back events for forwarded transactions at a read-write node, according to some embodiments.

FIG. 8 is a high-level flowchart illustrating various methods and techniques to implement roll-back events for forwarded transactions at a read-write node, according to some embodiments. As indicated at 810, a roll-back event may be detected for a read-write transaction at a read-write node for a transaction started at a read-only node. A roll-back event may be triggered by a failure to successfully complete a write (e.g., due to conflict), session timeout, or a user manually closing the session, in some embodiments.

As indicated at 820, the read-write transaction at the read-write node may be rolled back, in some embodiments. As indicated at 830, notification of the aborted read-write transaction may be sent to the read-only node, in some embodiments. As indicated at 840, in some embodiments, the transaction may be aborted at the read-only node. In some embodiments, a new session can be created instead of aborting the transaction at the read-only node (e.g., when the read only node had not yet submitted a write statement to the read-write node).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
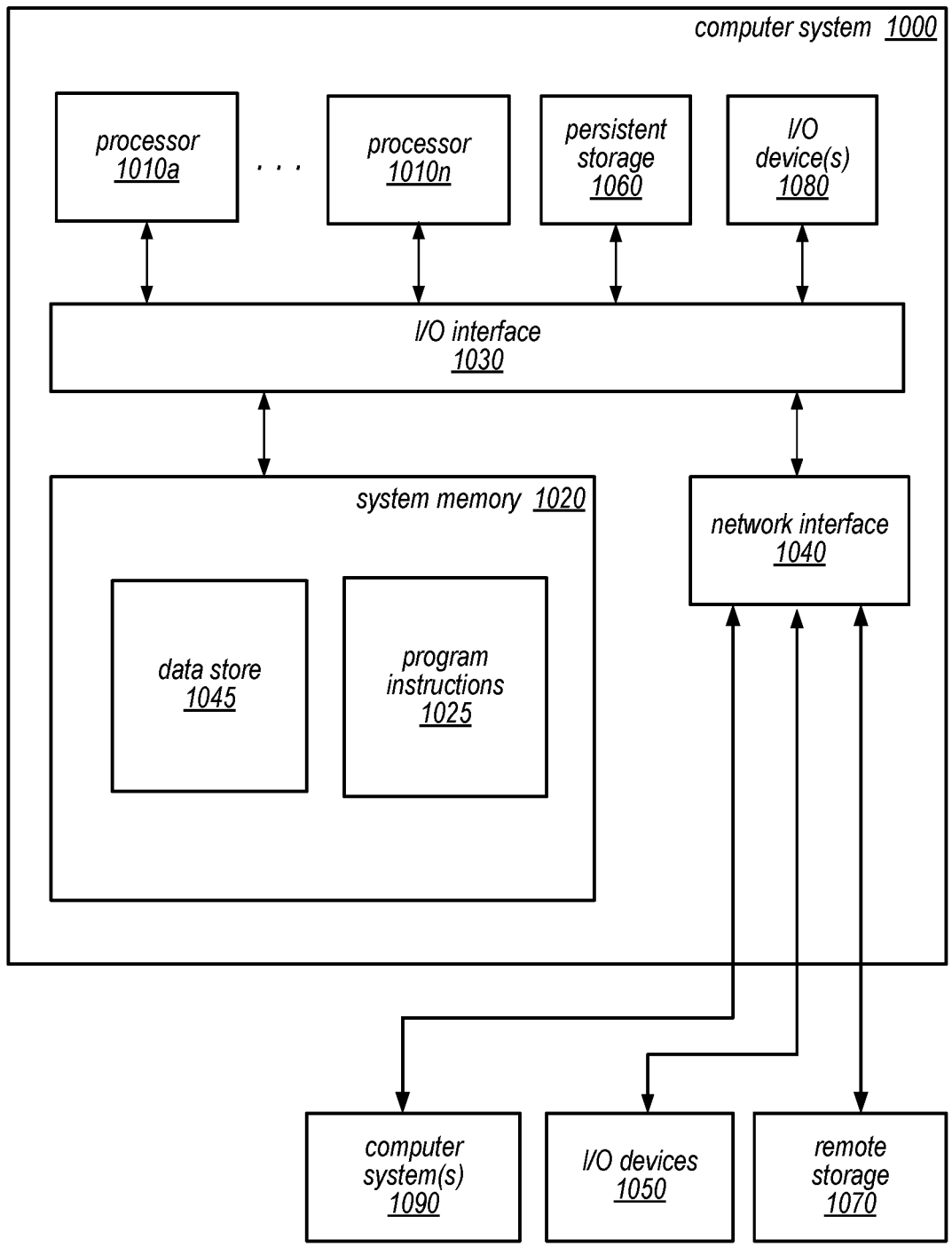
FIG. 9 is a block diagram illustrating an example computer system, according to various embodiments.

FIG. 9 is a block diagram illustrating an example computer system that may implement the techniques for selective forwarding for multi-statement database transactions, according to various embodiments described herein. For example, computer system 1000 may implement a primary node and/or one of a plurality of storage nodes of a separate storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of nodes, respectively comprising at least one processor and a memory, that implement a database system, wherein one of the plurality of nodes implements a read-only node for the database system and another one of the plurality of nodes implements a read-write node for the database system distinct from the read-only node, and wherein the read-only node is configured to perform only read statements and the read-write node is configured to perform write statements;
wherein the read-only node is configured to:
receive a read statement as part of a transaction started at the read-only node;
determine a read view of database data to perform the read statement;
receive a write statement as part of the transaction;
send the write statement to the read-write node for the database;
wherein the read-write node is configured to
perform the write statement as a primary node transaction to the database;
return an acknowledgment of performing the write statement to the read-only node;
wherein the read-only node is further configured to:
receive another read statement as part of the transaction after the write statement;
wait to perform the other read statement until after:
the acknowledgement of the performance of the write statement is received from the read-write node; and
the read view of the database is updated to include the write statement acknowledged by the read-write node.

2. The system of claim 1, wherein the read-only node is further configured to:
receive a request to commit the transaction;
send a request to commit the primary node transaction to the read-write node;
responsive to receipt of an acknowledgement that the primary node transaction committed, return a response indicating that the transaction committed.

3. The system of claim 1,
wherein the read-write node is further configured to:
detect a rollback event for the primary node transaction;
rollback the primary node transaction; and
send a notification to the read-only node that the primary node transaction aborted;
wherein the read-only node is further configured:
abort the transaction at the read-only node; and
send a notification of the aborted transaction to a client that submitted the transaction.

4. The system of claim 1, wherein the database system is implemented as part of a database service offered by a provider network and wherein forwarding of transactions to the read-write node is enabled via a request to the database service.

5. A method, comprising:
receiving, at a read-only node for a database, a write statement as part of a transaction started at the read-only node, wherein the read-only node is configured to perform only read statements;
sending, by the read-only node, the write statement to a read-write node for the database, wherein the read-write node is a node distinct from the read-only node and configured to perform write statements;
performing, by the read-write node, the write statement as a transaction to the database;
receiving, by the read-only node, a read statement received as part of the transaction after the write statement;
waiting, by the read-only node, to perform the read statement until after:
receiving, at the read-only node, an acknowledgement of the performance of the write statement from the read-write node; and
updating, by the read-only node, a read view of the database determined at the read-only node to include the write statement.

6. The method of claim 5, further comprising:
detecting, by the read-write node, a rollback event for the read-write node transaction;
performing, by the read-write node, a rollback of the read-write node transaction;
sending, by the read-write node, a notification to the read-only node that the read-write node transaction aborted;
responsive to receiving the notification at the read-only node:
aborting the transaction at the read-only node; and
sending, by the read-only node, a notification of the aborted transaction to a client that submitted the transaction.

7. The method of claim 6, wherein a session to establish communications for the transaction is established between the read-only node and the read-write node, and wherein detecting the rollback event for the read-write node transaction comprises an idle time for the session exceeding a session timeout for the session.

8. The method of claim 6, wherein a session to establish communications for the transaction is established between the read-only node and the read-write node, and wherein detecting the rollback event for the read-write node transaction comprises receiving a request to end the session at the read-write node.

9. The method of claim 6, wherein a session to establish communications for the transaction is established between the read-only node and the read-write node, and wherein detecting the rollback event for the read-write node transaction comprises receiving a request to end the session at the read-write node.

10. The method of claim 5, wherein updating the read view of the database at the read-only node to include the write statement comprises applying an update received from the read-write node that includes a logical sequence number (LSN) equivalent to a statement LSN received with an acknowledgement of the performance of the write statement from the read-write node.

11. The method of claim 5, wherein a session to establish communications for the transaction is established between the read-only node and the read-write node and wherein the method further comprises:
detecting, by the read-write node, a rollback event for the read-write node transaction;

performing, by the read-write node, a rollback of the read-write node transaction;

sending, by the read-write node, a notification to the read-only node that the read-write node transaction aborted;

responsive to receiving the notification at the read-only node:

establishing a new session between the read-only node and the read-write node.

12. The method of claim 5, wherein the read view is created in response to another write statement sent as part of the transaction before the write statement is received.

13. The method of claim 5, further comprising:

receiving, at the read-only node, a request to commit the transaction;

sending, by the read-only node, a request to commit the read-write node transaction to the read-write node;

responsive to receiving an acknowledgement that the read-write node transaction committed, return a response indicating that the transaction committed.

14. One or more non-transitory, computer-readable storage media, storing program instructions that when executed on or across one or more computing devices cause the one or more computing devices to implement:

receiving, at a read-only node for a database, a write statement as part of a transaction started at the read-only node, wherein the read-only node is configured to perform only read statements;

sending, by the read-only node, the write statement to a read-write node for the database, wherein the read-write node is a node distinct from the read-only node and configured to perform write statements;

receiving, by the read-only node, a read statement received as part of the transaction after the write statement;

waiting, by the read-only node, to perform the read statement until after:

receiving, at the read-only node, an acknowledgment that the write statement was performed as part of a read-write node transaction to the database; and updating, by the read-only node, a read view of the database determined at the read-only node to include the write statement.

15. The one or more non-transitory, computer-readable storage media of claim 14, storing program instructions that when executed by the one or more computing devices cause the one or more computing devices to further implement:

receiving, at the read-only node, a request to commit the transaction;

sending, by the read-only node, a request to commit the read-write node transaction to the read-write node;

responsive to receiving an acknowledgement that the read-write node transaction committed, return a response indicating that the transaction committed.

16. The one or more non-transitory, computer-readable storage media of claim 14, storing program instructions that when executed by the one or more computing devices cause the one or more computing devices to further implement:

receiving, at the read-only node, a notification that the read-write node transaction aborted from the read-write node;

responsive to receiving the notification at the read-only node:

aborting the transaction at the read-only node; and sending, by the read-only node, a notification of the aborted transaction to a client that submitted the transaction.

17. The one or more non-transitory, computer-readable storage media of claim 16, wherein a session to establish communications for the transaction is established between the read-only node and the read-write node, and wherein the read-write node transaction aborted after exceeding a session timeout for the session.

18. The one or more non-transitory, computer-readable storage media of claim 16, wherein a session to establish communications for the transaction is established between the read-only node and the read-write node, and wherein the read-write node transaction aborted after receiving a request to end the session at the read-write node.

19. The one or more non-transitory, computer-readable storage media of claim 14, wherein the read view is created in response to a read statement sent as part of the transaction before the write statement is received.

20. The one or more non-transitory, computer-readable storage media of claim 14, wherein the database is implemented as part of a database service offered by a provider network and wherein forwarding of transactions to a read-write node is enabled via a request to the database service.

* * * * *